(12) United States Patent
Kotha et al.

(10) Patent No.: US 11,770,449 B2
(45) Date of Patent: Sep. 26, 2023

(54) METHODS AND SYSTEMS FOR EXTENDING RDMA FOR DYNAMIC/PROGRAMMABLE REMOTE OPERATION REGISTRATION AND INVOCATION

(71) Applicant: Pensando Systems Inc., Milpitas, CA (US)

(72) Inventors: Murty Subba Rama Chandra Kotha, San Jose, CA (US); Balakrishnan Raman, Fremont, CA (US); Harinadh Nagulapalli, San Jose, CA (US); Vishwas Danivas, Santa Clara, CA (US); Sanjay Shanbhogue, Santa Clara, CA (US); Raja Rao Tadimeti, San Jose, CA (US); Madhava Rao Cheethirala, San Jose, CA (US)

(73) Assignee: PENSANDO SYSTEMS INC., Milpitas, CA (US)

( * ) Notice: Subject to any disclaimer, the term of this patent is extended or adjusted under 35 U.S.C. 154(b) by 261 days.

(21) Appl. No.: 17/138,596

(22) Filed: Dec. 30, 2020

(65) Prior Publication Data

US 2022/0210224 A1    Jun. 30, 2022

(51) Int. Cl.
*G06F 15/16* (2006.01)
*H04L 67/1097* (2022.01)
*G06F 13/28* (2006.01)

(52) U.S. Cl.
CPC .......... *H04L 67/1097* (2013.01); *G06F 13/28* (2013.01); *G06F 2213/28* (2013.01)

(58) Field of Classification Search
CPC ... H04L 67/1097; G06F 13/28; G06F 2213/28
See application file for complete search history.

(56) References Cited

U.S. PATENT DOCUMENTS 7,711,793 B1 *   5/2010   Wilson ................ G06F 11/2089
                                                    711/100
7,860,941 B1 * 12/2010   Wilson .................. H04L 49/358
                                                    709/217

(Continued)

OTHER PUBLICATIONS

Shah, et. al.; Remote Direct Memory Access (RDMA) Protocol Extensions; Jun. 2014; RFC 7306, Internet Engineering Task Force; pp. 1-34 (Year: 2014).*

(Continued)

*Primary Examiner* — Oleg Survillo
(74) *Attorney, Agent, or Firm* — LOZA & LOZA LLP

(57) ABSTRACT

InfiniBand transport protocol today supports RDMA operations such as read and write with each operation having an opcode defined in the InfiniBand standard. Currently, new RDMA operations require extending the transport protocol by defining a new opcode, its respective header and enhancing InfiniBand implementations to support this new behavior. A more robust way of extending RDMA without requiring an expanding set of opcodes is to register computer code by associating it with a code key similar to a memory key. An InfiniBand channel adapter receiving an RDMA request that includes a code key executes the associated computer code, perhaps compiling it first, in response to receiving the RDMA request. The RDMA response returned to the requester includes an execution result indicating an outcome of executing the executable computer code.

21 Claims, 13 Drawing Sheets

(56) References Cited

U.S. PATENT DOCUMENTS

| | | | | |
|---|---|---|---|---|
| 10,509,764 B1* | 12/2019 | Izenberg | ............... | G06F 16/22 |
| 11,374,872 B1* | 6/2022 | Danivas | ............. | H04L 47/6215 |
| 2014/0325012 A1* | 10/2014 | Guerin | ............. | G06F 15/17331 |
| | | | | 709/212 |
| 2014/0359043 A1* | 12/2014 | Gao | ................... | G06F 15/167 |
| | | | | 709/212 |
| 2022/0206957 A1* | 6/2022 | Nagulapalli | ........ | G06F 12/1081 |

OTHER PUBLICATIONS

Kalia, et al.; Using RDMA Efficiently for Key-Value Services; Aug. 2014; SIGCOMM; pp. 1-15 (Year: 2014).*

InfiniBrand, "InfiniBandTM Architecture Specification", vol. 1, Release 1.4, Apr. 7, 2020, 1981pgs.

\* cited by examiner

US 11,770,449 B2

METHODS AND SYSTEMS FOR EXTENDING RDMA FOR DYNAMIC/PROGRAMMABLE REMOTE OPERATION REGISTRATION AND INVOCATION

TECHNICAL FIELD

The embodiments relate to storage area networks, InfiniBand, channel adapters, computer networks, network appliances, packet processing pipelines, P4 packet processing pipelines, programmable packet processing pipelines implemented using special purpose circuitry, remote direct memory access (RDMA), and high performance computing (HPC).

BACKGROUND

High performance computing environments and data warehouses often use InfiniBand (IB) to carry data between processes, computers, and storage devices. InfiniBand is a computer networking communications standard that is published and maintained by the InfiniBand trade organization. Two consumers connected via InfiniBand each have a queue pair (QP), with each QP having a receive queue and a send queue. Modern data centers can have tens of thousands of computers, each running many virtual machines or other processes. Those processes may communicate with another use InfiniBand QPs, and in particular using InfiniBand RDMA data operations. InfiniBand's RDMA capabilities, including RDMA over ethernet (RoCE v1 and RoCE v2), are specified and described in: "The InfiniBand Architecture Specification Volume 1, Release 1.4" published by the InfiniBand Trade Association on Apr. 7, 2020 ("the InfiniBand Specification").

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the subject matter described in this disclosure can be implemented in a method. The method can include registering a computer code with an InfiniBand channel adapter of a server to obtain a code key that is associated with the computer code. The method can also include receiving, by a responder at the server and from a requester, a remote direct memory access (RDMA) request that includes the code key, executing an executable computer code based on the computer code in response to receiving the RDMA request, and sending to the requester a RDMA response that includes an execution result indicating an outcome of executing the executable computer code.

Another aspect of the subject matter described in this disclosure can be implemented in a method. The method can include sending, to a responder at a server and by a requester, an RDMA request that includes a code key associated with a computer code registered with an InfiniBand channel adapter of the server. The method can also include receiving from the responder a RDMA response that includes an execution result indicating an outcome of executing an executable computer code based on the computer code.

Another aspect of the subject matter described in this disclosure can be implemented by an InfiniBand channel adapter configured to register a computer code and produce a code key that is associated with the computer code, receive, from a requester, an RDMA request that includes the code key, and send to the requester a RDMA response that includes an execution result indicating an outcome of executing an executable computer code based on the computer code.

In some implementations of the methods and devices, creating the RDMA administrative data structure includes creating an InfiniBand queue pair. In some implementations of the methods and devices, creating the RDMA administrative data structure includes creating a work request queue for work requests submitted by a requester accessing a channel adapter. In some implementations of the methods and devices, the method also includes submitting a remote procedure call (RPC) work request (WR) that includes the code key to a queue pair of the requester, transmitting the RDMA request based on the RPC WR, and receiving the RDMA response.

In some implementations of the methods and devices the RPC WR indicates a memory region storing an input value for the executable computer code, and the RDMA request includes the input value. In some implementations of the methods and devices the RPC WR includes a memory key associated with a memory region of the requester, the RDMA request includes the memory key, and the execution result is written into the memory region of the requester. In some implementations of the methods and devices the computer code is the executable computer code. In some implementations of the methods and devices wherein the server compiles the computer code to produce the executable computer code. In some implementations of the methods and devices the requester sends the computer code to the server.

In some implementations of the methods and devices the executable computer code is configured to receive a second computer code as an input value, and register the second computer code with the InfiniBand channel adapter of the server to obtain a second code key that is associated with the second computer code, wherein the execution result includes the second code key. In some implementations of the methods and devices the RDMA request is based on a remote procedure call (RPC) work request (WR) that includes the code key and that is submitted to a queue pair of the requester.

In some implementations of the methods and devices the InfiniBand channel adapter is further configured to send, to a responder at a server having a second InfiniBand channel adapter, a second RDMA request that includes a second code key associated with a second computer code registered with the second InfiniBand channel adapter, and receive from the responder a second RDMA response that includes a second execution result that results from executing a second executable computer code based on the second computer code.

In some implementations of the methods and devices the InfiniBand channel adapter is further configured to send the second RDMA request based on an RPC WR that is received by a queue pair of the InfiniBand channel adapter and that includes the second code key. In some implementations of the methods and devices the RPC WR indicates a memory region storing an input value for the executable computer code, and the second RDMA request includes the input value. In some implementations of the methods and devices the RDMA request includes a memory key associated with a memory region of the requester, and the execution result is written into the memory region of the requester.

In some implementations of the methods and devices the code key is a memory key that indicates a memory region of the requester that includes the executable computer code, the responder uses the memory key to obtain the executable computer code, and the responder produces the execution result by executing the executable computer code.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

Throughout the description, similar reference numbers may be used to identify similar elements.

DETAILED DESCRIPTION

Figure 1:
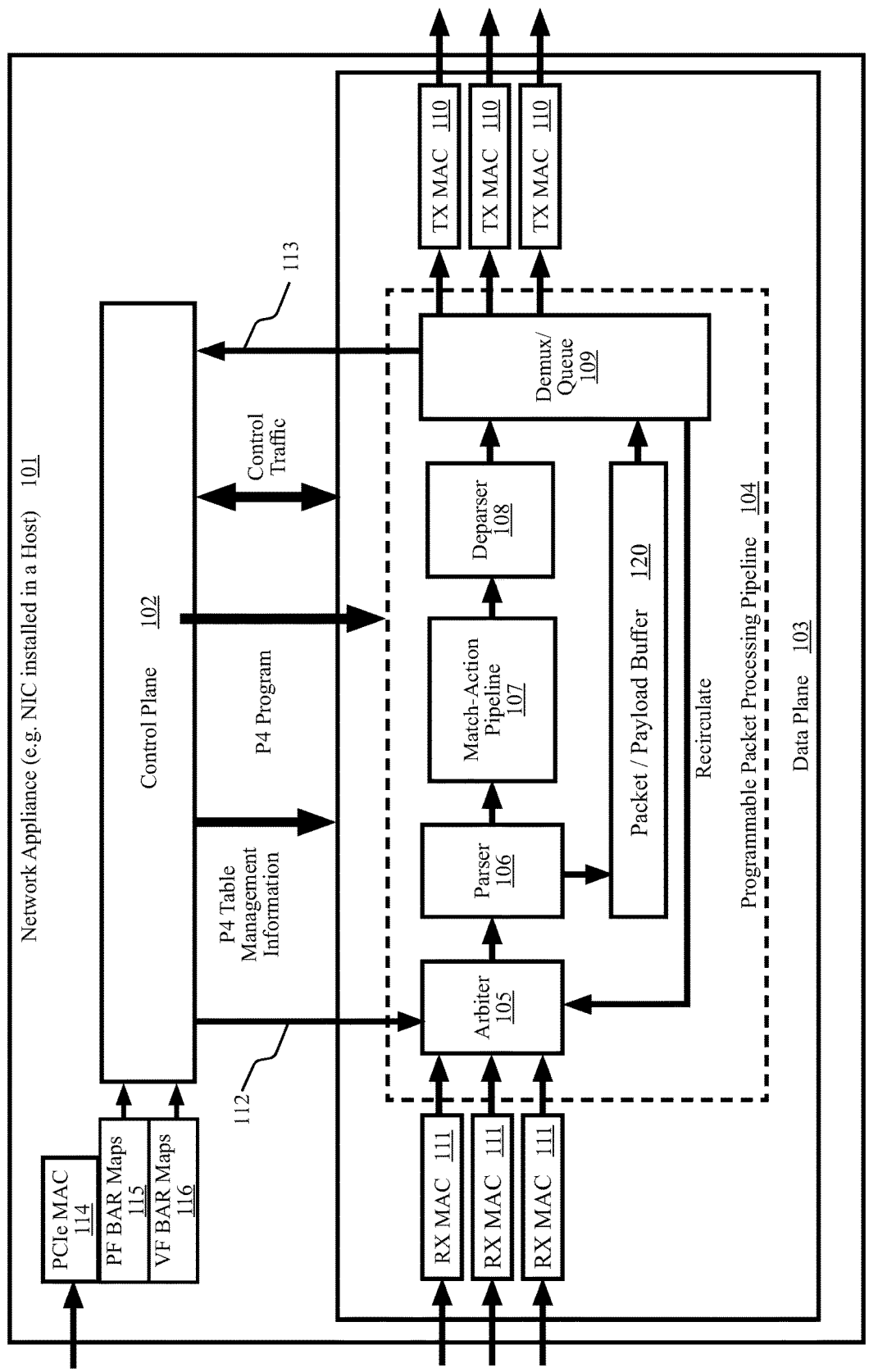
FIG. 1 is a functional block diagram of a network appliance having a control plane and a data plane and in which aspects may be implemented.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

The InfiniBand transport protocol currently supports RDMA operations such as read and write as well as atomic operations such as compare-swap, fetch-add with each operation having an opcode defined in the InfiniBand standard. Currently, new RDMA operations require extending the transport protocol by defining a new opcode, its respective header and enhancing InfiniBand implementations to support this new behavior. For interoperability reasons these extensions would also be pushed to standard. The currently defined RDMA mechanisms thereby allow remote execution of specific RDMA operations but do not provide for custom or extended operations on remote hosts.

Custom operations can be provided by extending RDMA to implement extended operation via a new mechanism similar to the way an application registers its virtual memory with the channel adapter and gets back a handle called a "key". Using the new mechanism, an application can register a custom "code" fragment (computer code) and get back a handle called a code key. For clarity, a "code key" is returned during computer code registration. A code key is different from a "memory-key" which is returned during memory registration. The computer code can be specified in a high-level programming language such as P4 (used by P4 packet processing pipelines, discussed below) or C that is compiled to produce executable computer code. Alternatively, the computer code can be executable computer code specified in a high-level language such as Python.

The code-key associated with the computer code can be shared with remote applications that can then invoke the computer code by presenting the key in the data path via an RDMA request. The channel adapter takes care of enforcing the access permissions associated with the key and invoking the corresponding registered computer code. In some cases, this would be done without involving the local CPU. The computer code's output values can be returned to the remote application via an RDMA response that is responsive to the RDMA request that led to invoking the computer code.

Extending RDMA operations via registered computer code invoked via a code key in an RDMA request has many advantages. One of the advantages is that RDMA extensions can be implemented without requiring a new opcode for every extension. The transport layer (InfiniBand) doesn't need to know the contents of memory, the semantics of the arguments or how the result is computed. It can simply provide a transport to relay the argument bytes in the forward direction, hand them over to the computer code along (possibly with data retrieved via a memory key) and transport the bytes resulting from the computer code execution back to the caller. As such, RDMA operations can be extended on an ad hoc basis.

In the field of data networking, the functionality of network appliances such as switches, routers, and network interface cards (NICs) are often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Aspects described herein process packets using match-action pipelines. A match-action pipeline is a part of the data plane that can process network traffic flows, which include I/O and InfiniBand traffic flows, extremely quickly if the match-action pipeline is configured to process those traffic flows. Upon receiving a packet of a network traffic flow, the match-action pipeline can generate an index from data in the packet header. Finding a flow table entry for the network traffic flow at the index location in the flow table is the "match" portion of "match-action". If there is a "match", the "action" is performed to thereby process the packet. If there is no flow table entry for the network traffic flow, it is a new network traffic flow that the match action pipeline is not yet configured to process. If there is no match, then the match-action pipeline can perform a default action.

The high-volume and rapid decision-making that occurs at the data plane is often implemented in fixed function application specific integrated circuits (ASICs). Although fixed function ASICs enable high-volume and rapid packet processing, fixed function ASICs typically do not provide enough flexibility to adapt to changing needs. Data plane processing can also be implemented in field programmable gate arrays (FPGAs) to provide a high level of flexibility in data plane processing. Although FPGAs are able to provide a high level of flexibility for data plane processing, FPGAs are relatively expensive to produce and consume much more power than ASICs on a per-packet basis.

FIG. 1 is a functional block diagram of a network appliance having a control plane and a data plane and in which aspects may be implemented. A network appliance 101, such as a NIC, can have a control plane 102 and a data plane 103. The control plane provides forwarding information (e.g., in the form of table management information) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIBs) and Label Forwarding Information Bases (LFIBs), while the data plane is responsible for a high volume of time-sensitive forwarding decisions that need to be made at a rapid pace. In some embodiments, the control plane may implement operations related to packet routing that include InfiniBand channel adapter management functions, Open Shortest Path First (OSPF), Enhanced Interior Gateway Routing Protocol (EI-GRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). In some embodiments, the data plane (which may also be referred to as the "forwarding" plane) may implement operations related to parsing packet headers, Quality of Service (QoS), filtering, encapsulation, queuing, and policing. Although some functions of the control plane and data plane are described, other functions may be implemented in the control plane and/or the data plane.

Some techniques exist for providing flexibility at the data plane of network appliances that are used in data networks. For example, the concept of a domain-specific language for programming protocol-independent packet processors, known simply as "P4," has developed as a way to provide some flexibility at the data plane of a network appliance. The P4 domain-specific language for programming the data plane of network appliances is currently defined in the "P416 Language Specification," version 1.2.0, as published by the P4 Language Consortium on Oct. 23, 2019, which is incorporated by reference herein. P4 (also referred to herein as the "P4 specification," the "P4 language," and the "P4 program") is designed to be implementable on a large variety of targets including programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The data plane 103 includes multiple receive media access controllers (MACs) (RX MAC) 111 and multiple transmit MACs (TX MAC) 110. The RX MACs 111 implement media access control on incoming packets via, for example, a MAC protocol such as Ethernet. In an embodiment, the MAC protocol is Ethernet and the RX MACs are configured to implement operations related to, for example, receiving frames, half-duplex retransmission and back-off functions, Frame Check Sequence (FCS), interframe gap enforcement, discarding malformed frames, and removing the preamble, Start Frame Delimiter (SFD), and padding from a packet. Likewise, the TX MACs 110 implement media access control on outgoing packets via, for example, Ethernet. In an embodiment, the TX MACs are configured to implement operations related to, for example, transmitting frames, half-duplex retransmission and back-off functions, appending an FCS, interframe gap enforcement, and prepending a preamble, an SFD, and padding.

As illustrated in FIG. 1, a P4 program is provided to the data plane 103 via the control plane 102. Communications between the control plane and the data plane can use a dedicated channel or bus, can use shared memory, etc. The P4 program includes software code that configures the functionality of the data plane 103 to implement particular processing and/or forwarding logic and to implement processing and/or forwarding tables that are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane and the data plane corresponds to a class of algorithms that describe transformations on packets by packet processing systems.

The data plane 103 includes a programmable packet processing pipeline 104 that is programmable using a domain-specific language such as P4 and that can be used to implement the programmable packet processing pipeline 104. As described in the P4 specification, a programmable packet processing pipeline can include an arbiter 105, a parser 106, a match-action pipeline 107, a deparser 108, and a demux/queue 109. The data plane elements described may be implemented as a P4 programmable switch architecture, as a P4 programmable NIC, or some other architecture. The arbiter 105 can act as an ingress unit receiving packets from RX-MACs 111 and can also receive packets from the control plane via a control plane packet input 112. The arbiter 105 can also receive packets that are recirculated to it by the demux/queue 109. The demux/queue 109 can act as an egress unit and can also be configured to send packets to a drop port (the packets thereby disappear), to the arbiter via recirculation, and to the control plane 102 via an output CPU port 113. The control plane is often referred to as a CPU (central processing unit) although, in practice, control planes often include multiple CPU cores and other elements. The arbiter 105 and the demux/queue 109 can be configured through the domain-specific language (e.g., P4).

The parser 106 is a programmable element that can be configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. In an embodiment, the information extracted from a packet by the parser is referred to as a packet header vector or "PHV." In an embodiment, the parser identifies certain fields of the header and extracts the data corresponding to the identified fields to generate the PHV. In an embodiment, the PHV may include other data (often referred to as "metadata") that is related to the packet but not extracted directly from the header, including for example, the port or interface on which the packet arrived at the network appliance. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 108 is a programmable element that is configured through the domain-specific language (e.g., P4) to generate packet headers from PHVs at the output of match-action pipeline 107 and to construct outgoing packets by reassembling the header(s) (e.g., Ethernet and IP headers, InfiniBand PDUs, etc.) as determined by the match-action pipeline. In some cases, a packet/payload may travel in a separate queue or buffer 120, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 108) before the demux/queue 109 sends the packet to the TX MAC 110 or recirculates it back to the arbiter 105 for additional processing.

A NIC 101 can have a PCIe (peripheral component interconnect extended) interface such as PCIe MAC (media access control) 114. A PCIe MAC can have a BAR (base address register) at a base address in a host system's memory space. Processes, typically device drivers within the host system's operating system, can communicate with the NIC via a set of registers beginning with the BAR. Some PCIe devices are SR-IOV (single root input output virtualization) capable. Such PCIe devices can have a PF (physical function) and multiple virtual functions (VFs). A PF BAR map 115 can be used by the host machine to communicate with the PCIe card. A VF BAR map 116 can be used by a VM running on the host to communicate with the PCIe card. Typically, the VM can access the NIC using a device driver within the VM and at a memory address within the VMs memory space. Many SR-IOV capable PCIe cards can map that location in the VM's memory space to a VF BAR. As such a VM may be configured as if it has its own NIC while in reality it is associated with a VF provided by a SR-IOV capable NIC. As discussed below, some PCIe devices can have multiple PFs. For example, a NIC can provide network connectivity via one PF and can provide an InfiniBand channel adapter via another PF. As such, the NIC can provide "NIC" VFs and "InfiniBand" VFs to VMs running on the host. The InfiniBand PF and VFs can be used for data transfers, such as RDMA transfers to other VMs running on the same or other host computers.

Figure 2:
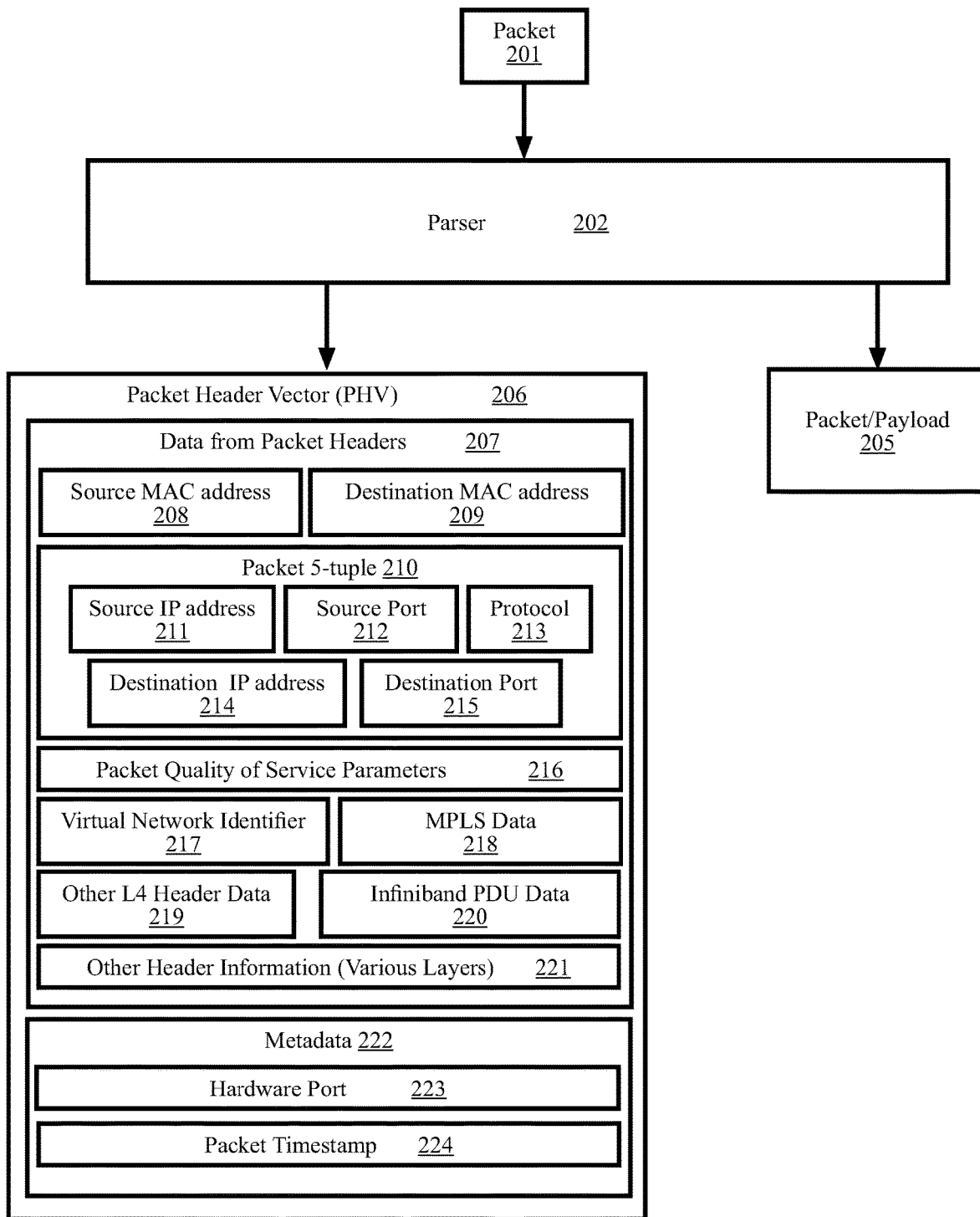
FIG. 2 is a high-level diagram illustrating an example of generating a packet header vector from a packet according to some aspects.

FIG. 2 is a high-level diagram illustrating an example of generating a packet header vector 206 from a packet 201 according to some aspects. The parser 202 can receive a packet 201 that has layer 2, layer 3, layer 4, and layer 7 headers and payloads. The parser can generate a packet header vector (PHV) from packet 201. The packet header vector 206 can include many data fields including data from packet headers 207 and metadata 222. The metadata 222 can include data generated by the network appliance such as the hardware port 223 on which the packet 201 was received and the packet timestamp 224 indicating when the packet 201 was received by the network appliance.

The source MAC address 208 and the destination MAC address 209 can be obtained from the packet's layer 2 header. The source IP address 211 can be obtained from the packets layer 3 header. The source port 212 can be obtained from the packet's layer 4 header. The protocol 213 can be obtained from the packet's layer 3 header. The destination IP address 214 can be obtained from the packet's layer 3 header. The destination port 215 can be obtained from the packets layer 4 header. The packet quality of service parameters 216 can be obtained from the packet's layer 3 header or another header based on implementation specific details. The virtual network identifier 217 may be obtained from the packet's layer 2 header. The multi-protocol label switching (MPLS) data 218, such as an MPLS label, may be obtained from the packet's layer 2 header. The other layer 4 data 219 can be obtained from the packet's layer 4 header. The InfiniBand PDU (protocol data unit) data 220 can be obtained from an InfiniBand PDU contained in, for example, a layer 4 payload. The InfiniBand PDU data can include an identifier for a destination queue pair, an opcode (e.g. RDMA opcode), a virtual memory address, a memory key, a code key, and other data transported in InfiniBand PDUs. The other header information 221 is the other information contained in the packet's layer 2, layer 3, layer 4, and layer 7 headers.

The packet 5-tuple 210 is often used for generating keys for match tables, discussed below. The packet 5-tuple 210 can include the source IP address 211, the source port 212, the protocol 213, the destination IP address 214, and the destination port 215.

Those practiced in computer networking protocols realize that the headers carry much more information than that described here, realize that substantially all of the headers are standardized by documents detailing header contents and fields, and know how to obtain those documents. The parser can also be configured to output a packet or payload 205. Recalling that the parser 202 is a programmable element that is configured through the domain-specific language (e.g., P4) to extract information from a packet, the specific contents of the packet or payload 205 are those contents specified via the domain specific language. For example, the contents of the packet or payload 205 can be the layer 3 payload.

Those practiced in protocols such as InfiniBand realize that the data packets communicated among InfiniBand consumers also have well defined and standardized formats. As such, InfiniBand packets, PDUs, and packet headers can be easily created and processed by a programmable data plane such as the data plane of a P4 programmable NIC. Specifically, the parser can parse InfiniBand packets and PDUs, the match-action pipeline can process InfiniBand packets and PDUs, the deparser can assemble InfiniBand packets and PDUs, the demux/queue can assemble InfiniBand packets and PDUs, and the network appliance or NIC can send and receive InfiniBand packets and PDUs.

Figure 3:
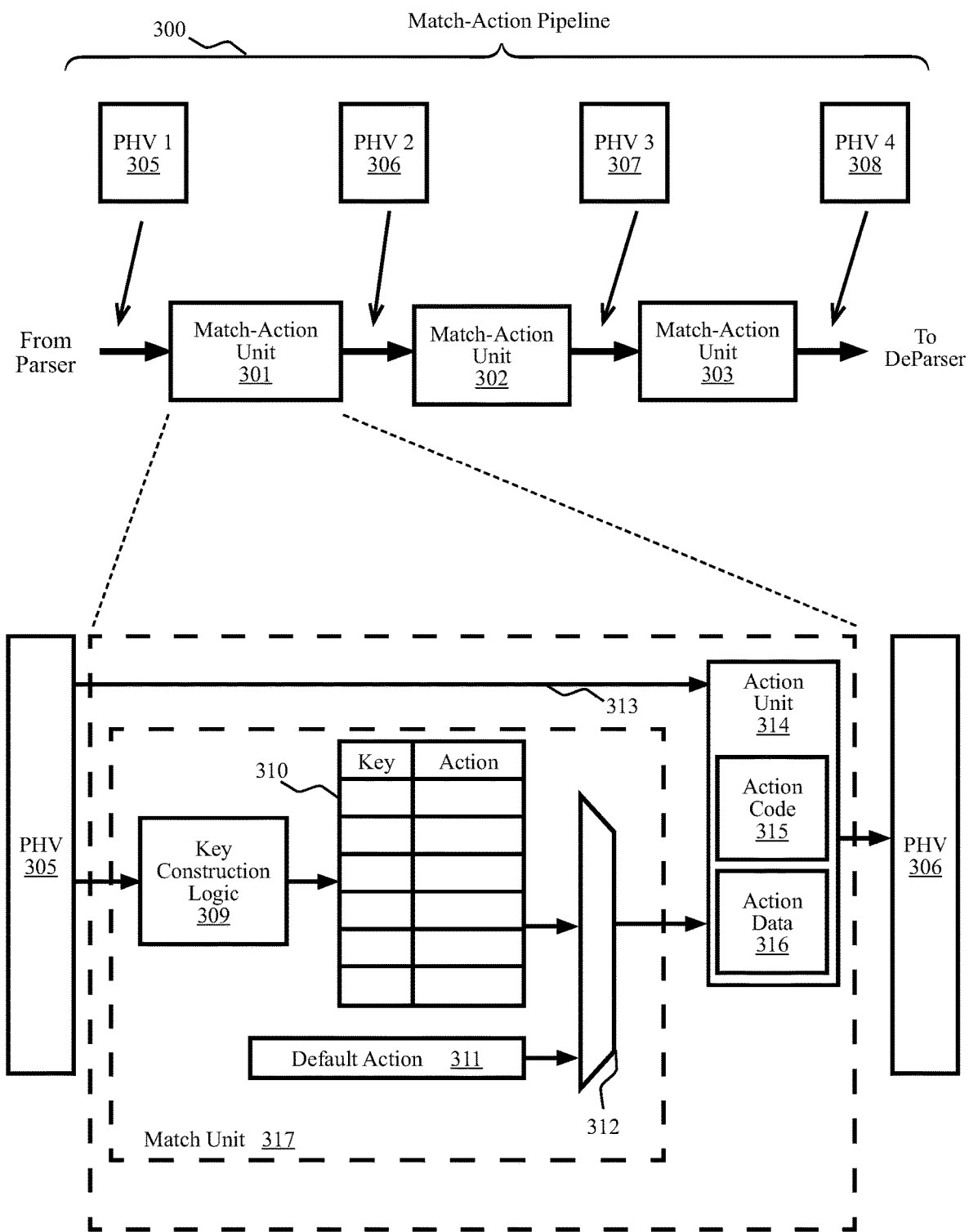
FIG. 3 is a functional block diagram illustrating an example of a match-action unit in a match-action pipeline according to some aspects.

FIG. 3 is a functional block diagram illustrating an example of a match-action unit 301 in a match-action pipeline 300 according to some aspects. FIG. 3 introduces certain concepts related to match-action units and match-action pipelines and is not intended to be limiting. The match-action units 301, 302, 303 of the match-action pipeline 300 are programmed to perform "match-action" operations in which a match unit performs a lookup using at least a portion of the PHV and an action unit performs an action based on an output from the match unit. In an embodiment, a PHV generated at the parser is passed through each of the match-action units in the match-action pipeline in series and each match-action unit implements a match-action operation. The PHV and/or table entries may be updated in each stage of match-action processing according to the actions specified by the P4 programming. In some instances, a packet may be recirculated through the match-action pipeline, or a portion thereof, for additional processing. Match-action unit 1 301 receives PHV 1 305 as an input and outputs PHV 2 306. Match-action unit 2 302 receives PHV 2 306 as an input and outputs PHV 3 307. Match-action unit 3 303 receives PHV 3 307 as an input and outputs PHV 4 308.

An expanded view of elements of a match-action unit 301 of match-action pipeline 300 is shown. The match-action unit includes a match unit 317 (also referred to as a "table engine") that operates on an input PHV 305 and an action unit 314 that produces an output PHV 306, which may be a modified version of the input PHV 305. The match unit 317 can include key construction logic 309, a lookup table 310, and selector logic 312. The key construction logic 309 is configured to generate a key from at least one field in the PHV (e.g. 5-tuple, InfiniBand queue pair identifiers, etc.). The lookup table 310 is populated with key-action pairs, where a key-action pair can include a key (e.g., a lookup key) and corresponding action code 315 and/or action data 316. In an embodiment, a P4 lookup table generalizes traditional switch tables, and can be programmed to implement, for example, routing tables, flow lookup tables, ACLs, and other user-defined table types, including complex multi-variable tables. The key generation and lookup functions constitute the "match" portion of the operation and produce an action that is provided to the action unit via the selector logic. The action unit executes an action over the input data (which may include data 313 from the PHV) and provides an output that forms at least a portion of the output PHV. For example, the action unit executes action code 315 on action data 316 and data 313 to produce an output that is included in the output PHV 306. If no match is found in the lookup table, then a default action 311 may be implemented. A flow miss is an example of a default action that may be executed when no match is found. In an embodiment, operations of the match-action unit are programmable by the control plane via P4 and the contents of the lookup table are managed by the control plane.

Figure 4:
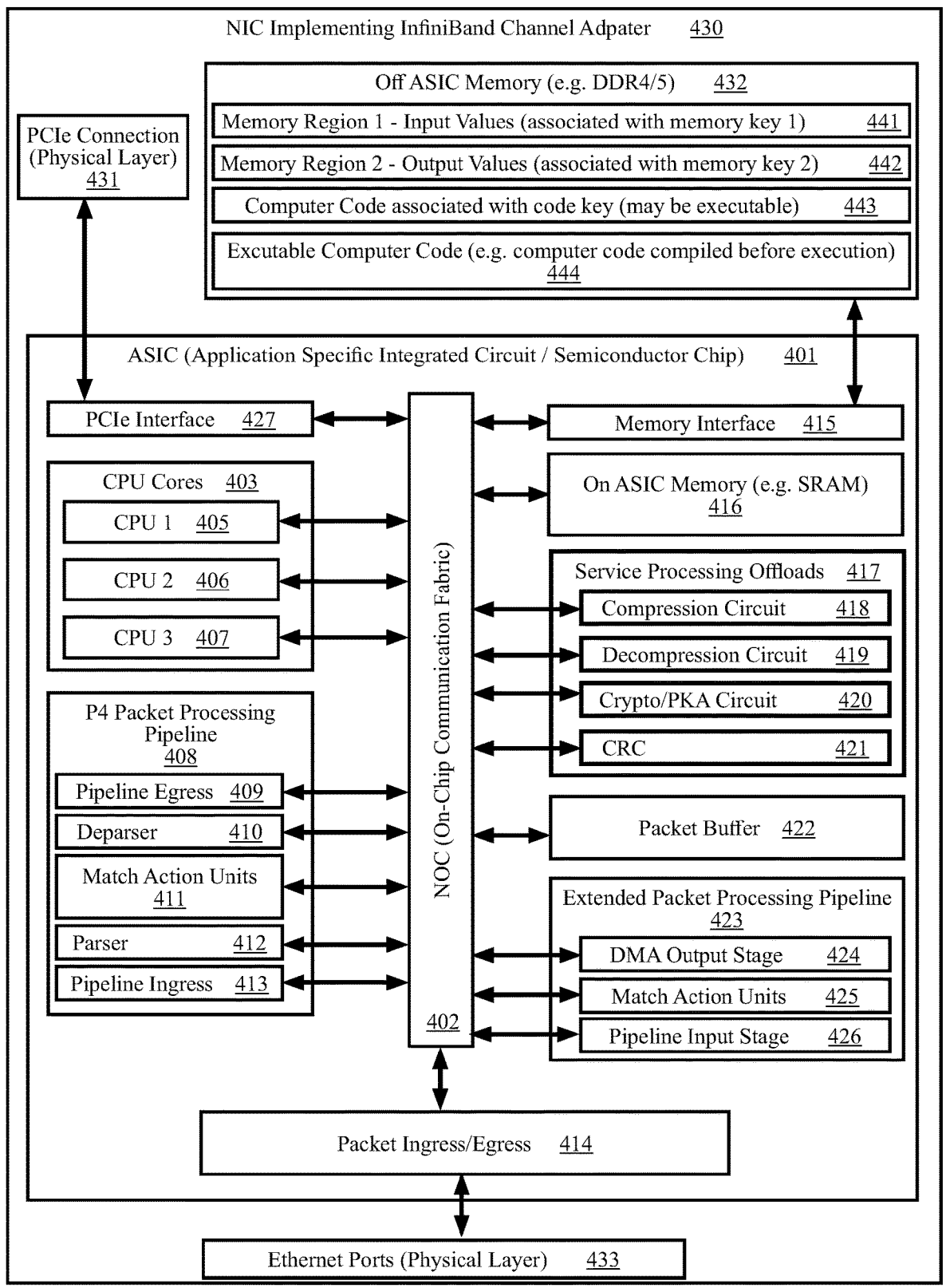
FIG. 4 is a functional block diagram of a NIC (network interface card) having an ASIC (application specific integrated circuit), according to some aspects.

FIG. 4 is a functional block diagram of a NIC (network interface card) 430 having an ASIC (application specific integrated circuit) 401, according to some aspects. The NIC 430 includes a PCIe connection 431, off ASIC memory 432, and ethernet ports 433. The PCIe connection provides for installing the NIC in a host computer having a PCIe bus. The off ASIC memory 432 can be one of the widely available memory modules or chips such as DDR4 SDRAM (double data rate 4 synchronous dynamic random-access memory) such that the ASIC has access to many gigabytes of memory on the NIC 430. The ethernet ports 433 provide physical connectivity to a computer network such as the internet.

The ASIC 401 is a semiconductor chip having many core circuits interconnected by an on-chip communications fabric, sometimes called a NOC (network on a chip) 402. NOCs are often implementations of standardized communications fabrics such as the widely used AXI bus. The ASIC's core circuits can include a PCIe interface 427, CPU cores 403, P4 packet processing pipeline 408 elements, memory interface 415, on ASIC memory (e.g. SRAM) 416, service processing offloads 417, a packet buffer 422, extended packet processing pipeline 423, and packet ingress/egress circuits 414. The PCIe interface 427 can be used to communicate with a host computer via the PCIe connection 431. The CPU cores 403 can include numerous CPU cores such as CPU 1 405, CPU 2 406, and CPU 3 407. The P4 packet processing pipeline 408 can include a pipeline ingress circuit 413, a parser circuit 412, match-action units 411, a deparser circuit 410, and a pipeline egress circuit 409. The service processing offloads 417 are circuits implementing functions that the ASIC uses so often that the designer has chosen to provide hardware for offloading those functions from the CPUs. The service processing offloads can include a compression circuit 418, decompression circuit 419, a crypto/PKA circuit 420, and a CRC calculation circuit 421. The specific core circuits implemented within the non-limiting example of ASIC 401 have been selected such that the ASIC implements many, perhaps all, of the functionality of an InfiniBand channel adapter and of a network appliance that processes network traffic flows carried by IP (internet protocol) packets.

The P4 packet processing pipeline 408 is a specialized set of elements for processing network packets such as IP (internet protocol) packets and InfiniBand PDUs (protocol data units). The P4 pipeline can be configured using a domain-specific language. The concept of a domain-specific language for programming protocol-independent packet processors, known simply as "P4," has developed as a way to provide some flexibility at the data plane of a network appliance. The P4 domain-specific language for programming the data plane of network appliances is currently defined in the "P416 Language Specification," version 1.2.0, as published by the P4 Language Consortium on Oct. 23, 2019. P4 (also referred to herein as the "P4 specification," the "P4 language," and the "P4 program") is designed to be implementable on a large variety of targets including programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The NIC 430 can include a memory 432 for running Linux or some other operating system, for memory regions 441, 442 that can be read and written during RDMA data transfers, for storing computer code 443, for storing executable computer code 444, for storing large data structures such as flow tables and other analytics, and for providing buffering resources for advanced features including TCP termination and proxy, deep packet inspection, storage offloads, and connected FPGA functions. The CPU cores 403 can be general purpose processor cores, such as ARM processor cores, MIPS processor cores, and/or x86 processor cores, as is known in the field. In an embodiment, each CPU core includes a memory interface, an ALU, a register bank, an instruction fetch unit, and an instruction decoder, which are configured to execute instructions independently of the other CPU cores. In an embodiment, the CPU cores are Reduced Instruction Set Computers (RISC) CPU cores that are programmable using a general-purpose programming language such as C.

RDMA refers to certain operations defined in the InfiniBand Specification including operations wherein data is transferred from the memory space of one process to that of another process with minimal copying. RDMA accomplishes this using memory keys. A local memory key can identify a local memory region. A local memory region is a memory region in a local host. A remote memory key can identify a remote memory region. A remote memory region is a memory region in a remote host. Using the local memory key, data in the local memory region can be incorporated directly into an outgoing InfiniBand PDU. Using the remote key, the remote host can write the data in the InfiniBand PDU directly from a receive buffer and into the remote memory region.

Memory region 1 441 can receive input data via RDMA transport from a client invoking computer code 443. The input values can be provided as inputs to the computer code 443. Memory region 2 442 can contain the output values resulting from running the computer code 443. The output values in memory region 2 can be returned to the client via RDMA transport. A server machine runs executable code 444 based on the computer code 443. For example, the computer code can be compiled to produce the executable code. Alternatively, the computer code 443 can be in executable form (e.g. compiled source code, Python code, JavaScript code, etc.). As such the executable computer code 444 based on the computer code 443 is the computer code 443.

In an embodiment, each CPU cores 403 also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. In an embodiment, each CPU core includes core-specific L1 cache, including instruction-cache and data-cache and L2 cache that is specific to each CPU core or shared amongst a small number of CPU cores. L3 cache may also be available to the CPU cores.

In an embodiment there are multiple CPU cores 403 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), certain InfiniBand channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The service processing offloads 417 are specialized hardware modules purposely optimized to handle specific tasks at wire speed, such as cryptographic functions, compression/decompression, etc.

The packet buffer 422 can act as a central on-chip packet switch that delivers packets from the network interfaces 433 to packet processing elements of the data plane and vice-versa. The packet processing elements can include a slow data path implemented in software and a fast data path implemented by packet processing circuitry 408, 423.

The packet processing circuitry 408, 423 can be a specialized circuit or part of a specialized circuit using one or more ASICs or FPGAs to implement programmable packet processing pipelines such as the programmable packet processing pipeline 104 of FIG. 1. Some embodiments include ASICs or FPGAs implementing a P4 pipeline as a fast data path within the network appliance. The fast data path is called the fast data path because it processes packets faster than a slow data path that can also be implemented within the network appliance. An example of a slow data path is a software implemented data path wherein the CPU cores 403 and memory 432 are configured via software to implement a slow data path. A network appliance having two data paths has a fast data path and a slow data path when one of the data paths processes packets faster than the other data path.

The ASIC 401 is illustrated with a P4 packet processing pipeline 408 and an extended packet processing pipeline 423. The extended packet processing pipeline is a packet processing pipeline that has a DMA output stage 424. The extended packet processing pipeline has match action units 425 that can be arranged as a match action pipeline such as match action pipeline 300. The extended packet processing pipeline has a pipeline input stage 426 that can receive PHVs or directives to perform operations. For example, data in the PHV can indicate that the PHV is a directive for implementing an RDMA operation. The key construction logic 309 of the MPUs can use the data to form a key that indexes into a lookup table 310 to locate an action. The MPUs can thereby execute actions such that the DMA output stage 424 writes InfiniBand PDU payload data into the off ASIC memory 432 or into the host memory.

All memory transactions in the NIC 430, including host memory transactions, on board memory transactions, and registers reads/writes may be performed via a coherent interconnect 402. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing pipeline circuits 408, 423, CPU cores 403, memory interface 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

The memory can store executable code that can be executed by the CPU cores to implement an InfiniBand channel adapter and to configure a packet processing pipeline to implement aspects of an InfiniBand channel adapter. FIG. 4 illustrates input values, computer code, and output values as stored in the NICs off ASIC memory 432 for execution using the CPU cores 403, the P4 packet processing pipeline 408, or extended packet processing pipeline 423. The input values, computer code, and output values may instead be stored in the host memory (e.g. via PCIe operations because the NIC is installed in the host) for execution by the host using its own processing units or other processing units available to the host.

Figure 5:
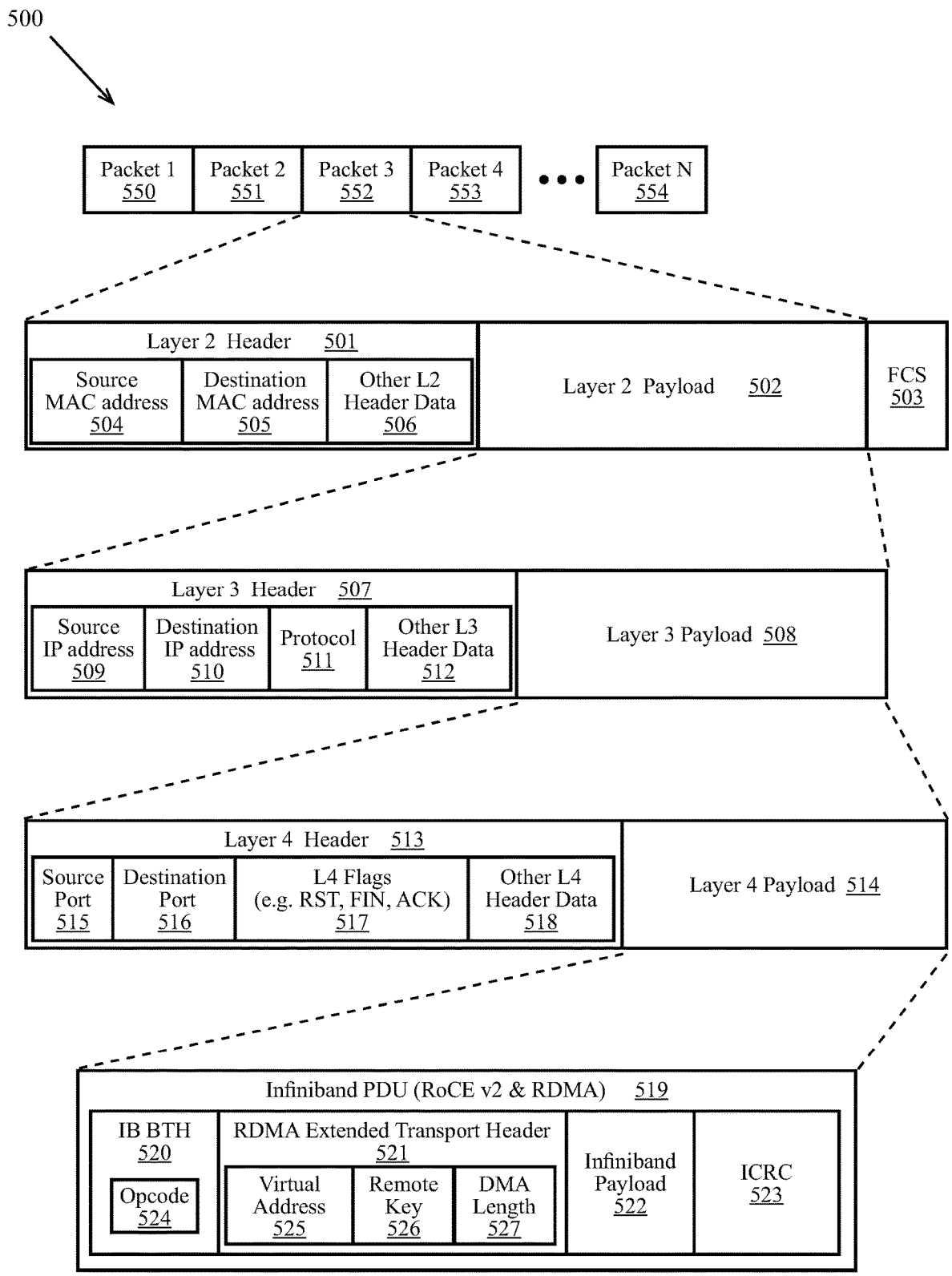
FIG. 5 illustrates packet headers and payloads of packets for network traffic flows including InfiniBand PDUs according to some aspects.

FIG. 5 illustrates packet headers and payloads of packets for network traffic flows 500 including InfiniBand PDUs according to some aspects. A network traffic flow 500 can have numerous packets such as a first packet 550, a second packet 551, a third packet 552, a fourth packet 553, and a final packet 554 with many more packets between the fourth packet 553 and the final packet 554. The term "the packet" or "a packet" can refer to any of the packets in a network traffic flow.

Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by a RX MAC 111 as a raw bit stream or transmitted by TX MAC 110 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet has a layer 2 header 501, a layer 2 payload 502, and a layer 2 FCS (frame check sequence). The layer 2 header can contain a source MAC address 504, a destination MAC address 505, and other layer 2 header data 506. The input ports 111 and output ports 110 of a network appliance 101 can have MAC addresses. In some embodiments a network appliance 101 has a MAC address that is applied to all or some of the ports. In some embodiments one or more of the ports each have their own MAC address. In general, each port can send and receive packets. As such, a port of a network appliance can be configured with a RX MAC 111 and a TX MAC 110. Ethernet, also known as Institute of Electrical and Electronics Engineers (IEEE) 802.3 is a layer 2 protocol. IEEE 802.11 (WiFi) is another widely used layer 2 protocol. The layer 2 payload 502 can include a Layer 3 packet. The layer 2 FCS 503 can include a CRC (cyclic redundancy check) calculated from the layer 2 header and layer 2 payload. The layer 2 FCS can be used to verify that the packet has been received without errors.

The internet layer, often called layer 3, is the network layer where layer 3 packets can be routed from a first node to a second node across multiple intermediate nodes. The nodes can be network appliances such as network appliance 101. Internet protocol (IP) is a commonly used layer 3 protocol. The layer 3 packet can have a layer 3 header 507 and a layer 3 payload 508. The layer 3 header 507 can have a source IP address 509, a destination IP address 510, a protocol indicator 511, and other layer 3 header data 512. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 504 indicating the first node, a destination MAC address 505 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 504 indicating the intermediate node, a destination MAC address 505 indicating the second node, and the IP packet as a payload. The layer 3 payload 508 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 507 using protocol indicator 511. Transmission control protocol (TCP), user datagram protocol (UDP), and internet control message protocol (ICMP) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 508 includes a TCP header and a TCP payload. UDP can provide for computer applications to send messages, in this case referred to as datagrams, to other hosts on an IP network using a connectionless model. When carrying UDP data, a layer 3 payload 508 includes a UDP header and a UDP payload. ICMP is used by network devices, including routers, to send error messages and operational information indicating success or failure when communicating with another IP address. ICMP uses a connectionless model.

A layer 4 packet can have a layer 4 header 513 and a layer 4 payload 514. The layer 4 header 513 can include a source port 515, destination port 516, layer 4 flags 517, and other layer 4 header data 518. The source port and the destination port can be integer values used by host computers to deliver packets to application programs configured to listen to and send on those ports. The layer 4 flags 517 can indicate a status of or action for a network traffic flow. For example, TCP has the RST, FIN, and ACK flags. RST indicates a TCP connection is to be immediately shut down and all packets discarded. A TCP FIN flag can indicate the final transmission on a TCP connection, packets transmitted before the FIN packet may be processed. ACK acknowledges received packets. A recipient of a FIN packet can ACK a FIN packet before shutting down its side of a TCP connection. A traffic flow can be terminated by a flow termination dialog. Examples of flow termination dialogs include: a TCP RST packet (with or without an ACK); and a TCP FIN packet flowed by a TCP ACK packet responsive to the TCP FIN packet. Other protocols also have well known flow termination dialogs. A layer 4 payload 514 can contain a layer 7 packet.

The application layer, often called layer 7, includes the protocols used by most applications for providing user services or exchanging application data over the network connections established by the lower level protocols. Examples of application layer protocols include RoCE v2 (RDMA over Converged Ethernet version 2), HTTP (Hypertext Transfer Protocol), FTP (File Transfer Protocol), SMTP (Simple Mail Transfer Protocol), and DHCP (Dynamic Host Configuration). Data coded according to application layer protocols can be encapsulated into transport layer protocol units (such as TCP or UDP messages), which in turn use lower layer protocols to effect actual data transfer.

A layer 4 payload may include a layer 7 packet. A layer 7 packet may be an InfiniBand PDU 519 having an InfiniBand BTH (base transport header) 520, RDMA extended transport header 521, InfiniBand payload 522, and ICRC (invariant cyclic redundancy check) 523. The BTH 520 can include the destination QP (queue pair), the operation code 524, packet sequence number, and partition. The RDMA extended transport header 521 contains data fields for RDMA operations such as a virtual address 525, a remote key 526, and a DMA length 527. The remote key can identify a memory region in a remote host. The virtual address 525 can be mapped to a physical address in the memory region. The DMA length can indicate the length, in bytes, of the DMA operation. The ICRC 523 is a CRC covering the fields in the PDU that do not change from the source to the destination.

Figure 6:
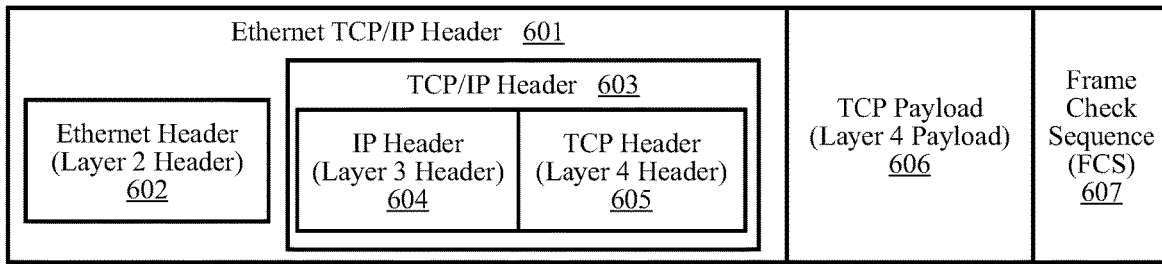
FIG. 6 illustrates an ethernet TCP/IP packet according to some aspects.

FIG. 6 illustrates an Ethernet TCP/IP packet according to some aspects. Ethernet packets, such as Ethernet TCP/IP packets, have an Ethernet header 602 and a frame check sequence (FCS) 607. As discussed above, Ethernet is a layer 2 protocol. An Ethernet TCP/IP header 601 has an Ethernet header 602 and a TCP/IP header 603. The TCP/IP header 603 has an IP header 604 and a TCP header 605. The Ethernet TCP/IP packet has a TCP payload 606 as the layer 4 payload.

Figure 7:
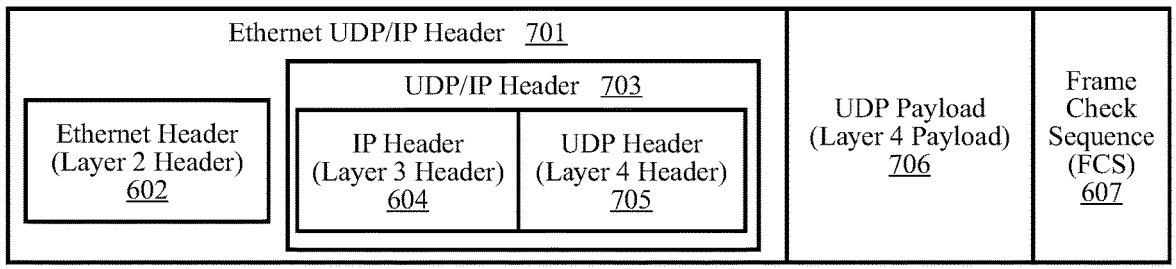
FIG. 7 illustrates an ethernet UDP/IP packet according to some aspects.

FIG. 7 illustrates an ethernet UDP/IP packet according to some aspects. An Ethernet UDP/IP packet differs from an Ethernet TCP/IP packet by having UDP as the layer 4 protocol. Ethernet UDP/IP packets, have an Ethernet header 602 and a frame check sequence (FCS) 607. An Ethernet UDP/IP header 701 has an Ethernet header 602 and a UDP/IP header 703. The UDP/IP header 703 has an IP header 604 and a UDP header 705. The Ethernet UDP/IP packet has a UDP payload 706 as the layer 4 payload.

Figure 8:
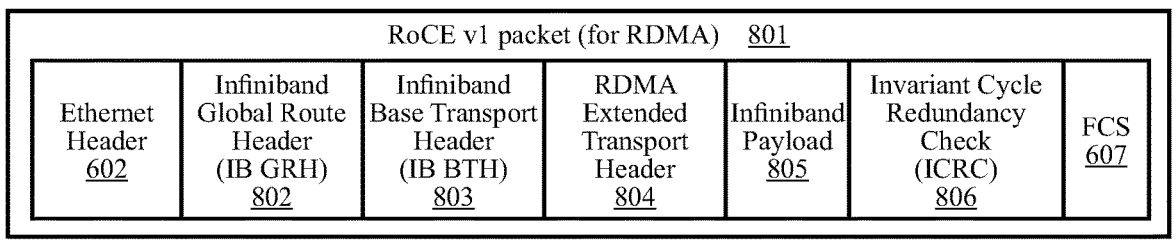
FIG. 8 illustrates a RoCE v1 (RDMA over converged ethernet, version 1) packet according to some aspects.

FIG. 8 illustrates a RoCE v1 (RDMA over converged ethernet, version 1) packet 801 according to some aspects. The format of RoCE v1 packets 801 is specified in "The InfiniBand Architecture Specification Volume 1, Release 1.4" published by the InfiniBand Trade Association on Apr. 7, 2020 ("the InfiniBand Specification"). The RoCE v1 packet 801 can be seen to be an ethernet packet having an Ethernet payload that includes an InfiniBand Global Route Header (IB GRH) 802, an InfiniBand Base Transport Header (IB BTH) 803, an RDMA extended transport header 804, an InfiniBand payload 805, and an Invariant Cyclic Redundancy Check (ICRC) 806 field.

Figure 9:
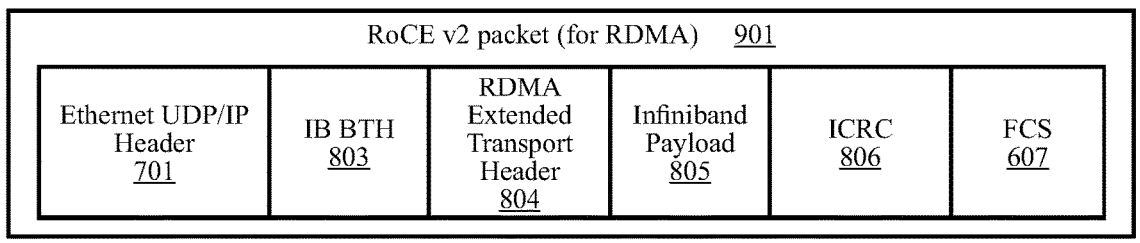
FIG. 9 illustrates a RoCE v2 (RDMA over converged ethernet, version 2) packet according to some aspects.

FIG. 9 illustrates a RoCE v2 (RDMA over converged ethernet, version 2) packet 901 according to some aspects. The format of RoCE v2 packets 901 is specified in the InfiniBand Specification. The RoCE v2 packet 901 can be seen to be an Ethernet UDP/IP packet having a UDP payload that includes an IB BTH 803, an RDMA extended transport header 804, an InfiniBand payload 805, and an ICRC 806. Here, Ethernet is the layer 2 transport for a UDP packet carrying the InfiniBand elements. Other layer 2 protocols may be used as the layer 2 transport.

Figure 10:
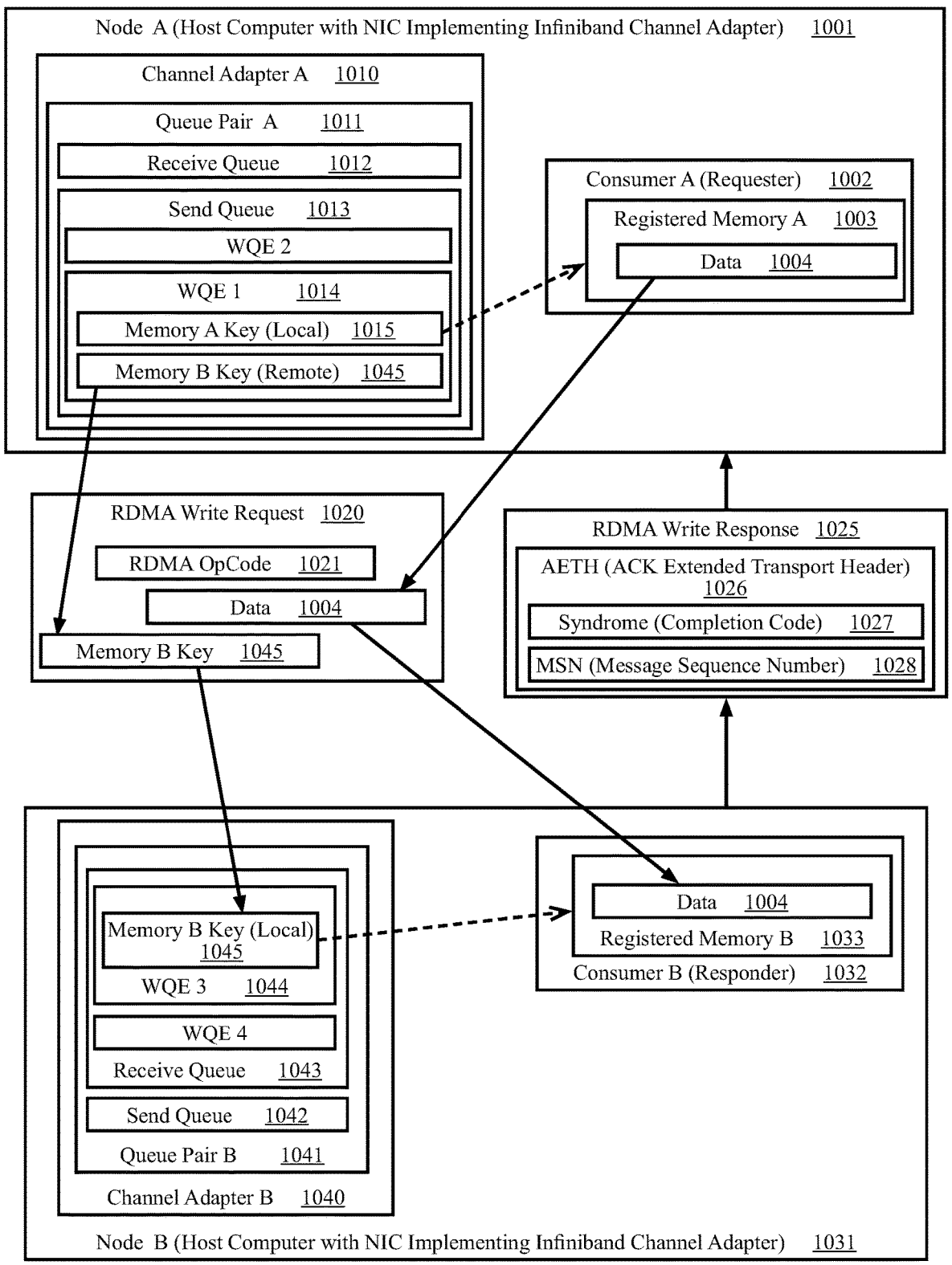
FIG. 10 is a high-level block diagram illustrating an RDMA write operation performed via NICs implementing InfiniBand channel adapters according to some aspects.

FIG. 10 is a high-level block diagram illustrating an RDMA write operation performed via NICs implementing InfiniBand channel adapters according to some aspects. In FIG. 10, consumer A 1002, running on node A 1001, is writing data 1004 into the memory of consumer B 1032 running on node B 1031. A consumer is typically a process or application running on a computer. The term "requester" is often used for the consumer that makes a request (e.g. RDMA write, RDMA read, etc.). The term "responder" is often used for the consumer that receives the request. For the illustrated write operation, consumer A is the requester while consumer B is the responder. The requester 1002 registers memory A 1003 with channel adapter A 1010 and receives memory A key 1015. Memory A key 1015 is associated with registered memory A 1003 such that channel adapter A 1010 can use memory key A to access, and control access to, registered memory A. The responder 1032 registers memory B 1033 with channel adapter B 1040 and receives memory B key 1045. Memory B key 1045 is associated with registered memory B 1033 such that channel adapter B 1040 can use memory key B 1045 to access, and control access to, registered memory B 1033. Memory B key 1045 has been communicated to the requester.

Channel adapter A 1010 provides a queue pair, queue pair A 1011, for use by the requester 1002. Channel adapter B 1040 provides a different queue pair, queue pair B 1041, for use by the responder 1032. Each queue pair has a receive queue and a send queue. Queue pair A 1011 and queue pair B 1041 are attached. As such, InfiniBand requests (e.g. RDMA requests) from the send queue 1013 of queue pair A 1011 can be received by the receive queue 1043 of queue pair B 1041. Similarly, InfiniBand requests from the send queue 1042 of queue pair B 1041 can be received by the receive queue 1012 of queue pair A 1011

To transfer data 1004 to the responder 1032, the requester 1002 can submit a work request (WR) to queue pair A 1011 specifying the memory A key 1015, the memory B key 1045, and location of data 1004 in memory A. Based on the WR, the channel adapter 1010 can place a work queue entry, WQE 1 1014, on send queue 1013. To receive data from the requester 1002, the responder 1032 can submit a work request (WR) to queue pair B 1041 specifying the memory B key 1045. Based on the WR, channel adapter B 1040 can place a work queue entry, WQE 3 1044, on receive queue 1043.

An RDMA write request 1020 based on WQE 1 1014 is sent to node B 1031. The RDMA write request 1020 includes an RDMA opcode 1021 for an RDMA write operation, the data 1004, and the memory B key 1045. Upon receiving the RDMA write request at the queue pair B 1041 receive queue 1043, channel adapter B 1040 writes the data 1004 into registered memory B and sends a RDMA write response 1025 back to queue pair A 1011. RDMA write response 1025 can include an AETH (ACK Extended Transport Header) including a syndrome 1027 (sometimes called an ACK syndrome) and an MSN (message sequence number) 1028. The syndrome 1027 can include a completion code indicating the success or failure of the RDMA write operation. The MSN 1028 can indicate the last message completed.

Figure 11:
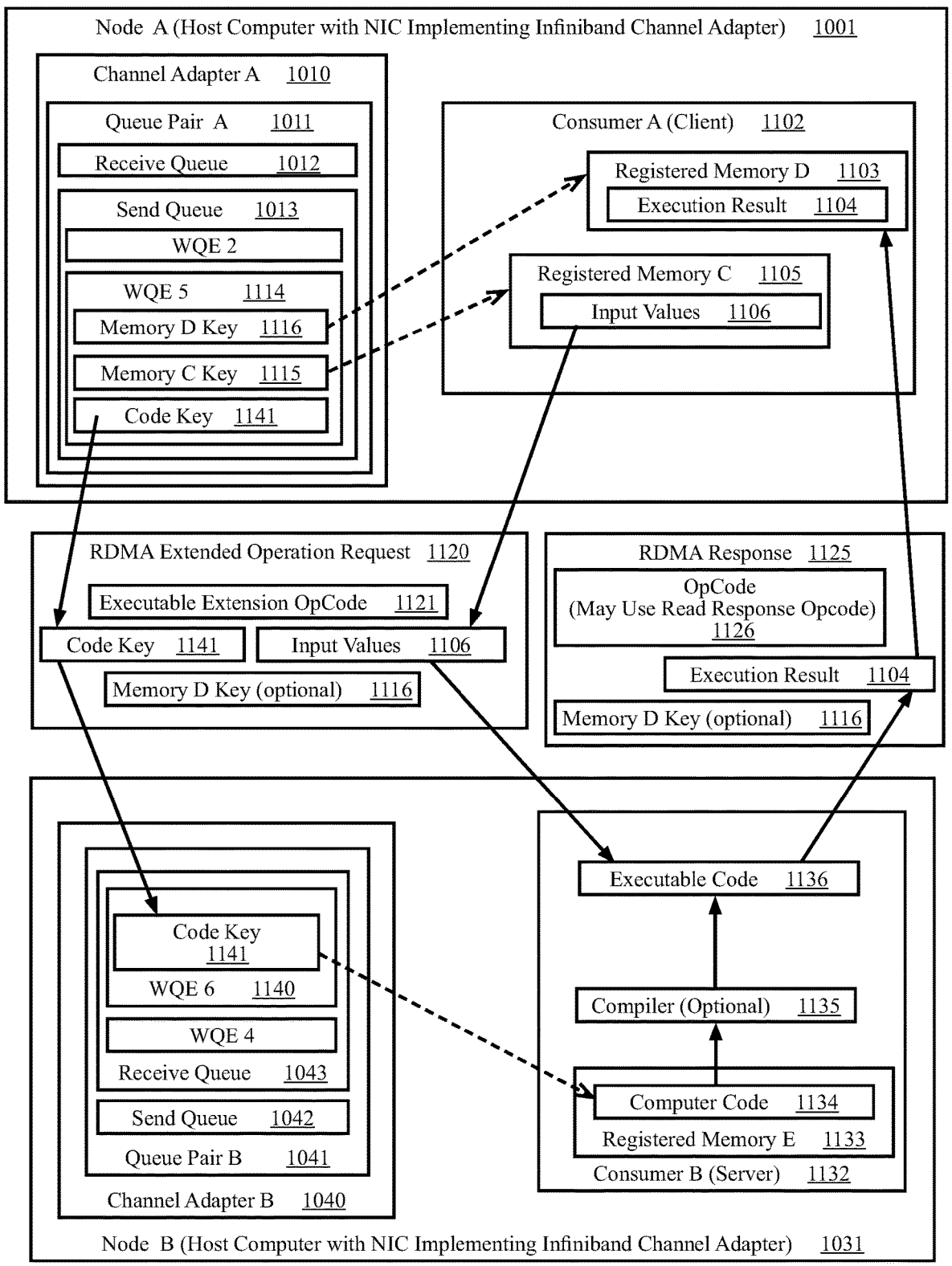
FIG. 11 is a high-level block diagram illustrating an extended RDMA operation with a server executing code as requested by a client according to some aspects.

FIG. 11 is a high-level block diagram illustrating a non-limiting example of an extended RDMA operation with a server executing code as requested by a client according to some aspects. Here, the client 1102 is consumer A and the server 1132 is consumer B. In preparation for requesting an extended RDMA operation, the client can register memory C 1105 and memory D 1103 with the channel adapter 1010 resulting in the memory C key 1115 and the memory D key 1116. The client can store input values 1106 in memory C 1105. The input values can be provided as inputs to computer code 1134. The results of executing the computer code 1134 can be stored in memory D 1103 by channel adapter A 1010. In preparation for performing the extended RDMA operation, the server 1132 can register computer code 1134 with channel adapter B 1040 resulting in code key 1141. Code key 1141 is associated with the registered computer code 1134. Here, the computer code is executed by node B 1031, the host computer running consumer B 1132. As such, channel adapter B 1040 may know nothing more about the computer code 1134 than its code key and where to write the input values. The code key 1141 is shared with the client after the computer code 1134 is registered. Furthermore, channel adapter A 1010 and channel adapter B 1040 may treat the input values as a sequence of bytes, not as typed data.

As shown in the non-limiting example of FIG. 11, The server 1132 can use a compiler 1135 to produce executable code 1136. For example, the server may compile the computer code 1134 automatically when it is invoked by the client via the code key 1141. One alternative is that the computer code is compiled once and then the executable code used thereafter when the computer code is invoked via the code key. Those familiar with make files (using the UNIX/Linux "make" facility) are familiar with such dependent compilation. As such, the executable code 1136 is based on the computer code 1134 by being compiled from the computer code 1134. Yet another alternative is that the computer code 1134 is the executable code 1136. In such a case, compilation is not required and the executable code 1136 is based on the computer code 1134 by being the computer code 1134.

The client can submit a WR to channel adapter A, the WR specifying the code key, input value memory key (memory C key 1115), and the execution result memory key (memory D key 1116). Submitting the WR results in WQE 5 1114 being placed on the send queue 1013. WQE 5 1114 can include the memory C key 1115, the memory D key 1116, and the code key 1141. While processing WQE 5, channel adapter A 1010 can send RDMA extended operation request 1120 to channel adapter B 1040. RDMA extended operation request 1120 can include an executable extension opcode 1121, the input values 1106, the memory D key 1116, and the code key 1141. The executable extension opcode 1121 may be the same opcode for all extended RDMA operations because the specific extended operation is indicated by the code key 1141 which is associated with computer code 1134. The input values 1106 may be treated simply as a sequence of bytes throughout the transport layer. The input values 1106 may be treated as typed data (e.g. ints, floats, chars, etc.) by the computer code once copied (as bytes) into an input buffer or input stack for the computer code.

Based on the code key 1141, the executable code 1136 (perhaps requiring compilation) can be invoked using the input values 1106 as inputs and to produce an execution result 1104. The execution result can be the result of a successful run of the computer code or can be an error result. The execution result 1104 is passed back to channel adapter A 1010 in RDMA response 1125. The RDMA response 1125 can contain an opcode 1126, the execution result 1104, and the memory D key 1116. Using the memory D key, the execution result 1104 can be written into registered memory D 1103. At node B 1031, the execution result can be written directly into a transport buffer, a reserved memory segment, a registered memory segment, or some other memory prior to being included in the RDMA response 1125.

In some implementations, the Memory D key 1116 is not included in the RDMA extended operation request 1120 or the RDMA response 1125 because it is held in WQE 5 1114 and is therefore available to channel adapter A 1010 for use in writing the execution result 1104 into registered memory D 1103. The InfiniBand Specification details a large number of opcodes that may be used in RDMA responses such as RDMA response 1125. As such, the opcode 1126 may be one of the already defined opcodes such as one of the RDMA read response opcodes currently used in responses to RDMA read requests.

Figure 12:
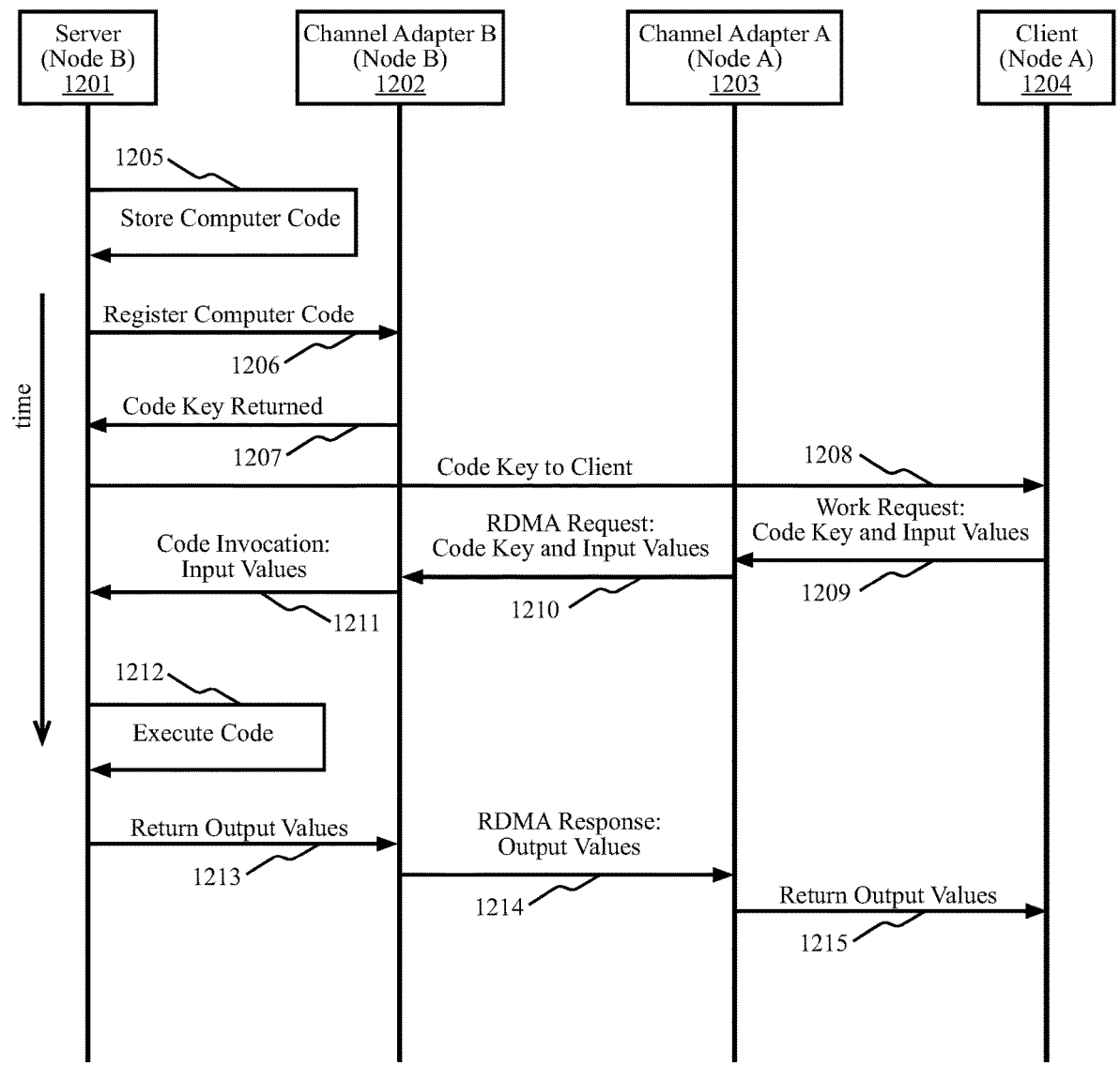
FIG. 12 is a high-level messaging diagram illustrating an extended RDMA operation with a responder executing code as requested by a requester according to some aspects.

FIG. 12 is a high-level messaging diagram illustrating an extended RDMA operation with a responder executing code as requested by a requester according to some aspects. As discussed above with respect to consumer B 1132 running on node B 1031, the responder can be server 1201 running on node B and accessing InfiniBand transport via channel adapter B 1202 of node B. As discussed above with respect to consumer A 1102 running on node A 1001, the requester can be client 1204 running on node A and accessing Infini-Band transport via channel adapter A 1203 of node A.

The server can store computer code in memory 1205 and can then register the computer code with channel adapter B 1206. In return, the server receives a code key 1207 associated with the registered computer code. The server can provide the code key to the client 1208 using any available mechanism including messaging, email, HTML post, RDMA write, and other data sharing mechanisms. To invoke the registered computer code, the client can submit a WR (work request) to a queue pair of channel adapter A 1209, the WR including the code key, input values, etc. The details of providing input values via a registered memory are discussed above. Alternatively, the input values may simply be provided as arguments to the WR API call. Yet another alternative is that no input may be needed (e.g. a "quote of the day" server). As discussed above, channel adapter A can place a WQE, based on the WR, on the send queue of the queue pair. Based on the WQE, channel adapter A sends an RDMA request to channel adapter B 1210 where it is placed on the receive queue of a queue pair for the server. The RDMA request can include the code key and any required input values. Based on the code key, the computer code is invoked 1211, the server executes the computer code 1212, and the execution results are returned 1213. Channel adapter B can include the execution results in a RDMA response sent to channel adapter A 1214. Channel adapter A can provide the execution results to the client 1215. As discussed above, the execution results can be written into a registered memory region for the client. Alternatively, execution results can be provided to the client as the return value(s) of submitting the work request 1209.

Figure 13:
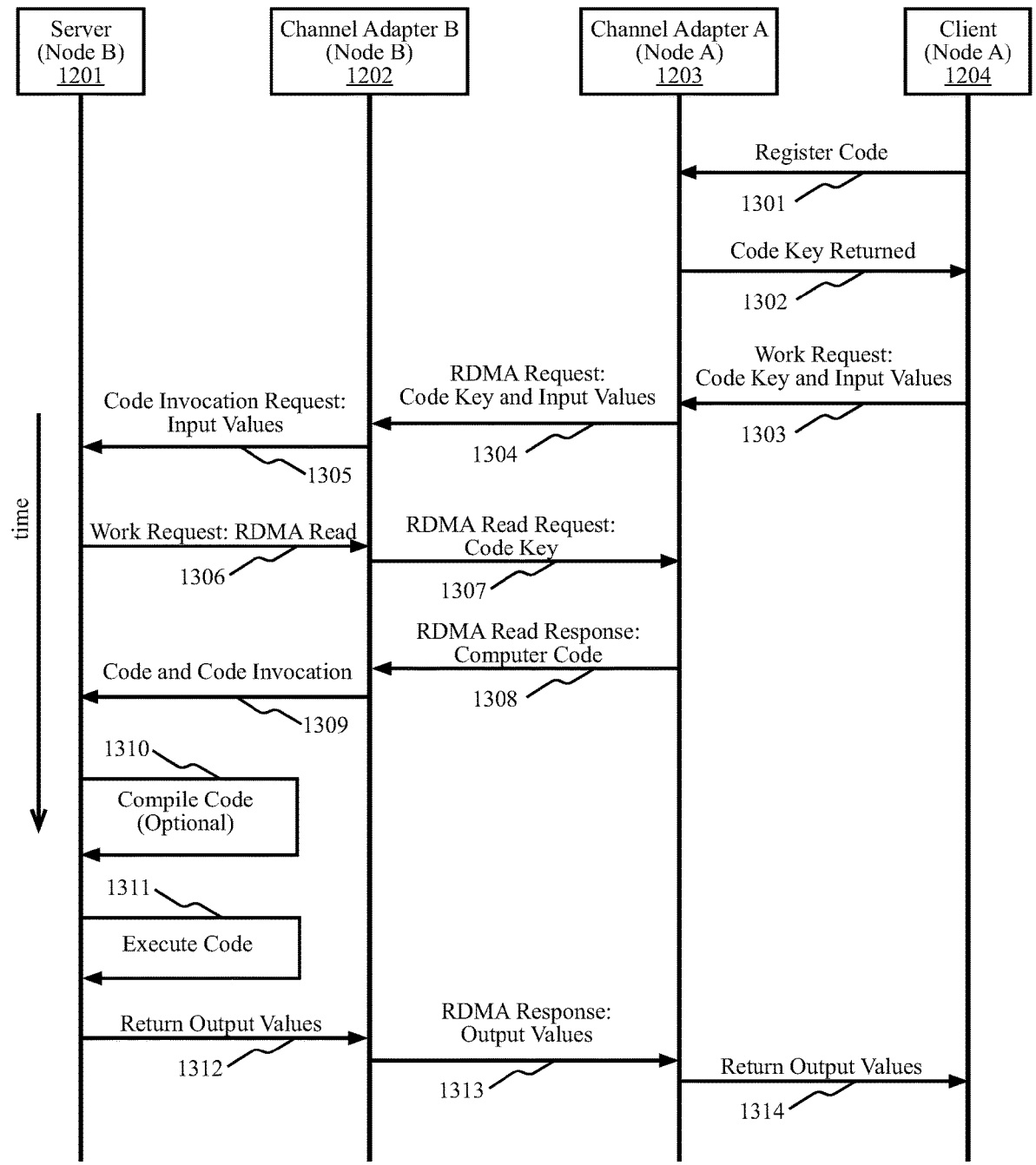
FIG. 13 is a high-level messaging diagram illustrating an extended RDMA operation with a responder executing code supplied by a requester according to some aspects.

FIG. 13 is a high-level messaging diagram illustrating an extended RDMA operation with a responder executing code supplied by a requester according to some aspects. The non-limiting example of FIG. 13 is a variation of the non-limiting example of FIG. 12 with the main difference being that the client provides the computer code for execution by the server. The client registers the code 1301 and a code key is returned 1302. The client sends a WR to channel adapter A 1303, the WR including the code key and input values (or memory key for stored input values) if needed. Channel adapter A sends a RDMA request based on the WR to channel adapter B 1304. The steps involved going from the WR to the queued WQE to the RDMA request are understood by one practiced in the art. The server is asked to execute the computer code 1305, but must first retrieve it. The server sends a WR for a RDMA read to channel adapter B 1306. The WR includes the code key, which can be treated as a memory key because the computer code can be read via RDMA as a byte sequence. Channel adapter B sends a RDMA read request to channel adapter A 1307 which responds by providing the computer code 1308 which may then be stored in a server memory region. The computer code is invoked on the server 1309. If needed, the server may compile the computer code 1310 before executing the computer code 1311 and returning the execution result to channel adapter B 1312. Channel adapter B includes the execution result in a RDMA response sent to channel adapter A 1313. Channel adapter A provides the execution results to the client 1314, perhaps as a return value for the command submitting the WR 1303.

Figure 14:
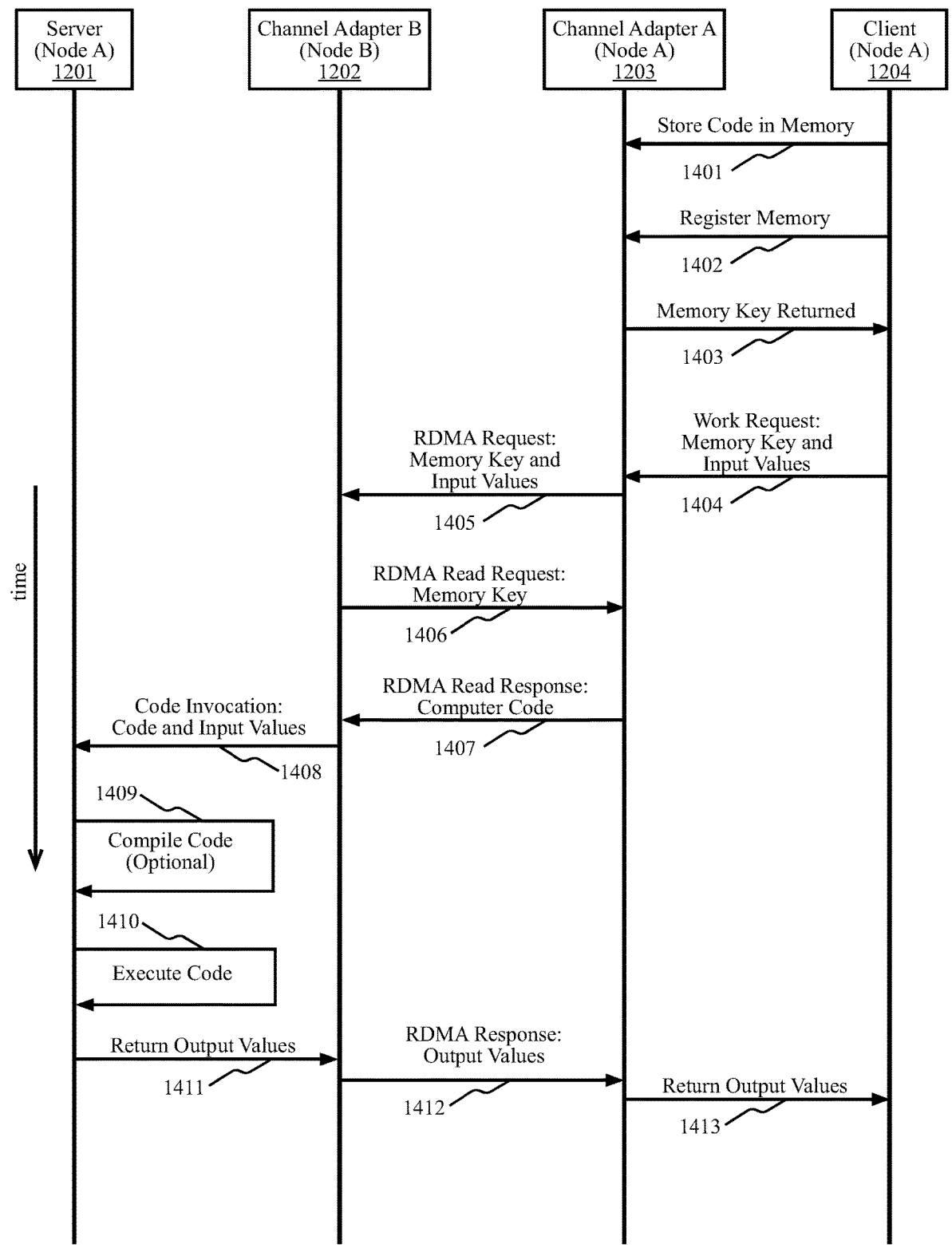
FIG. 14 is a high-level messaging diagram illustrating an extended RDMA operation with a responder executing code stored in the memory of a requester according to some aspects.

FIG. 14 is a high-level messaging diagram illustrating an extended RDMA operation with a responder executing code stored in the memory of a requester according to some aspects. The non-limiting example of FIG. 14 is similar to the non-limiting example of FIG. 13 with the main difference being the channel adapter B automatically obtains the computer code from the client's memory. The client stores the computer code in a memory region 1401, and registers the memory region 1402 with channel adapter A to obtain a memory key 1403 associated with the memory region. The client sends a WR to channel adapter A 1404, the WR including the memory key and input values if needed. Channel adapter A sends a RDMA request based on the WR to channel adapter B 1405. The WR to the queued WQE to the RDMA request steps are understood by one practiced in the art. Channel adapter B automatically sends an RDMA read request to channel adapter A 1406, the RDMA read request including the memory key. Channel adapter A responds by providing the computer code 1407. The computer code is invoked on the server 1408. The server may compile the computer code 1409 before executing the computer code 1410 and returning the execution result to channel adapter B 1411. Channel adapter B includes the execution result in a RDMA response sent to channel adapter A 1412. Channel adapter A provides the execution results to the client 1413.

Figure 15:
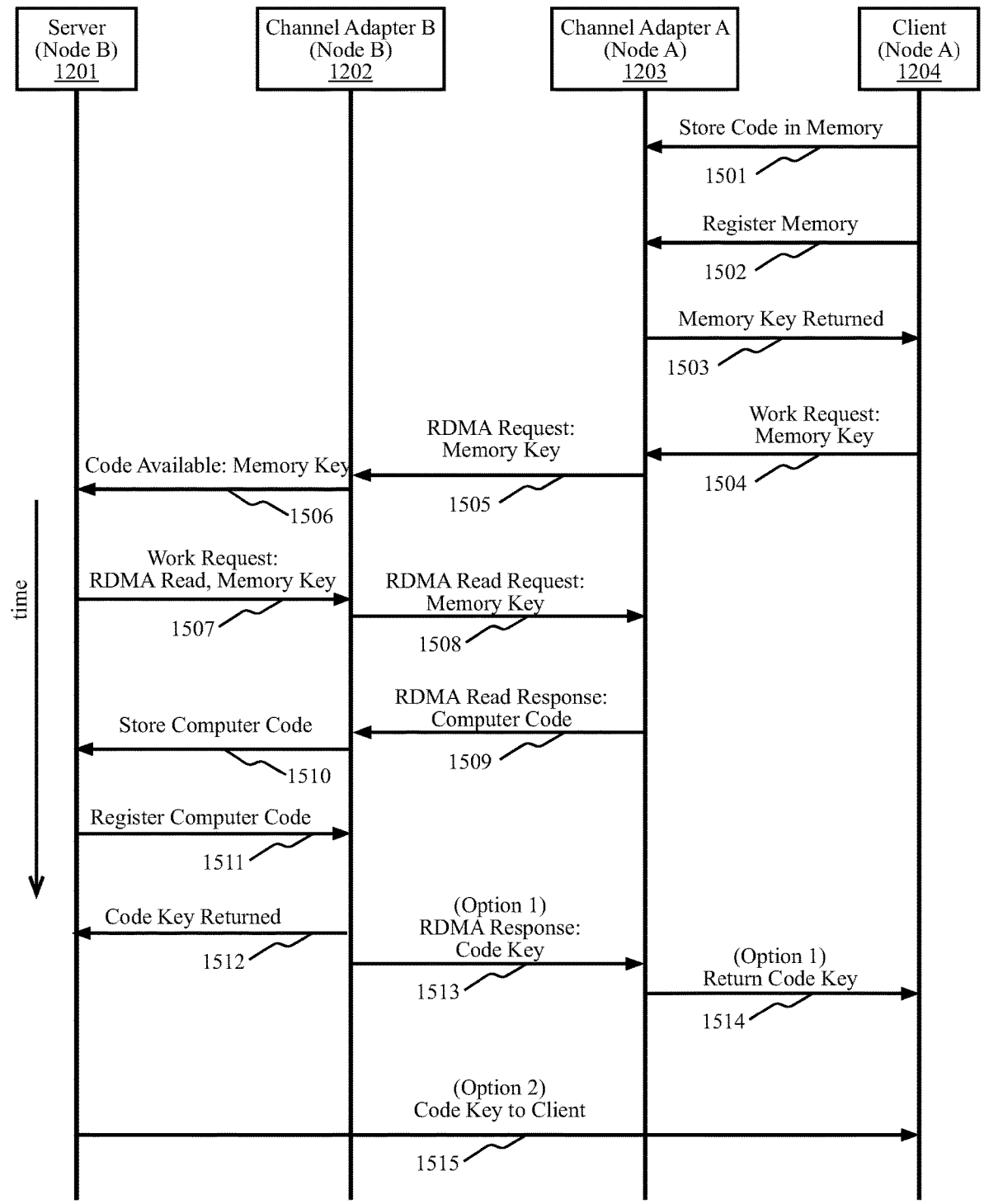
FIG. 15 is a high-level messaging diagram illustrating an extended RDMA operation with a responder obtaining and registering code stored in the memory of a requester according to some aspects.

FIG. 15 is a high-level messaging diagram illustrating an extended RDMA operation with a responder obtaining and registering code stored in the memory of a requester according to some aspects. Here, the client provides computer code to the server such that the code may be invoked at a later time by the client or a different client.

The client stores the computer code in a memory region 1501, and registers the memory region 1502 with channel adapter A to obtain a memory key 1503 associated with the memory region. The client sends a WR to channel adapter A 1504, the WR including the memory key. Channel adapter A sends a RDMA request based on the WR to channel adapter B 1505. Channel adapter B provides the memory key to the server 1506, alerting the server that the computer code is available. The server automatically sends a WR including the memory key to channel adapter B 1507 which leads to a RDMA read request sent from channel adapter B to channel adapter A 1508. In response, channel adapter A returns the computer code to channel adapter B 1509 which provides it to the server 1510 which stores it in a memory region. The server registers the computer code with channel adapter B 1511 and receives a code key 1512 associated with the computer code. The code key can then be provided to the client. In one option, channel adapter B responds to RDMA request 1505 with a RDMA response 1513 including the code key. The code key can then be provided to the client 1514, perhaps as the return value of the WR 1504. In another option, the server can provide the code key to the client 1515 using any available mechanism including messaging, email, HTML post, RDMA write, and other data sharing mechanisms.

Figure 16:
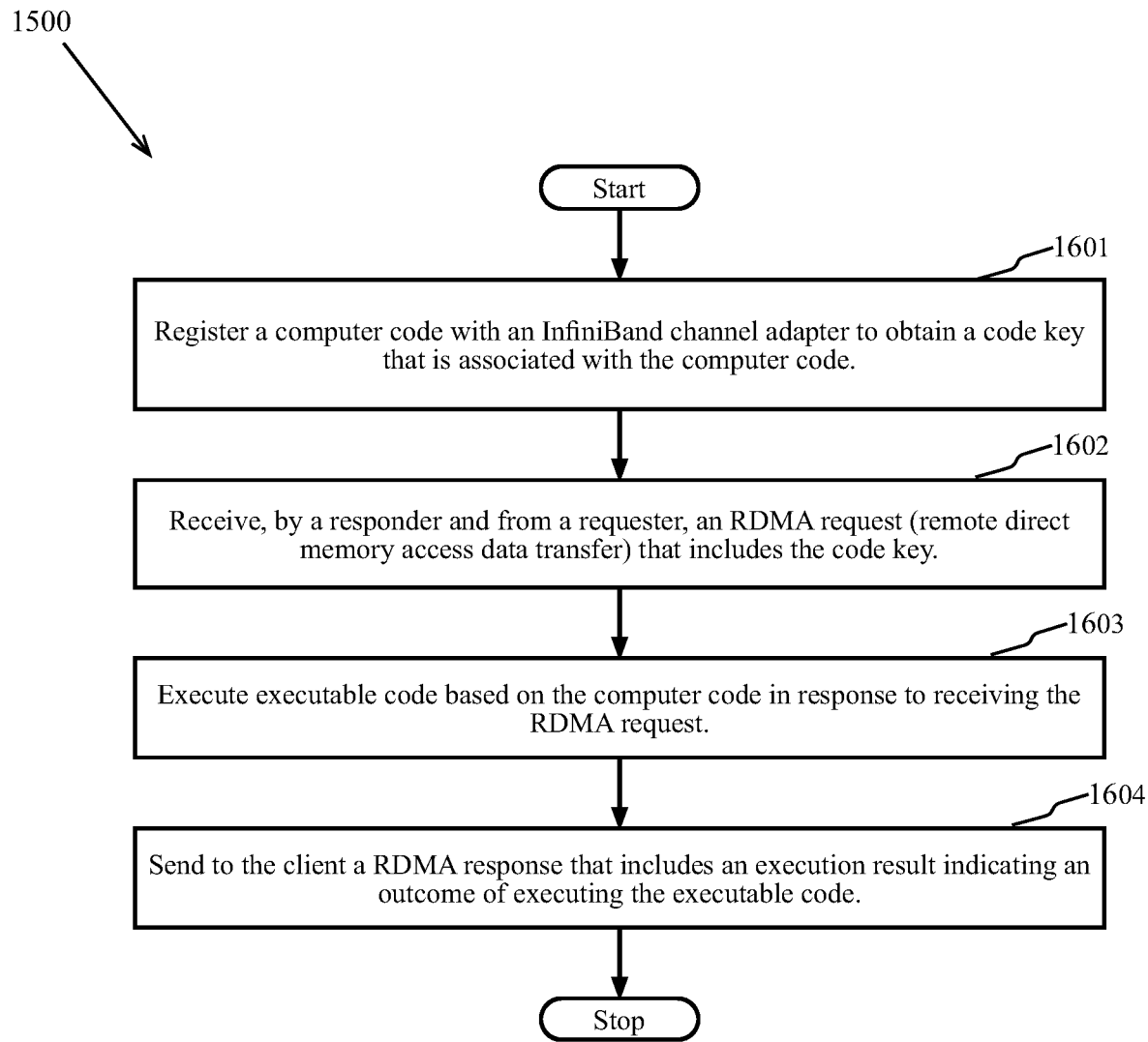
FIG. 16 is a high-level block diagram of a method for extending RDMA to implement extended operations according to some aspects.

FIG. 16 is a high-level block diagram of a method for extending RDMA to implement extended operations according to some aspects. After the start, at block 1601 the method can register a computer code with an InfiniBand channel adapter to obtain a code key that is associated with the computer code. At block 1602, the method can receive, by a responder and from a requester, an RDMA request (remote direct memory access data transfer) that includes the code key. At block 1603, the method can execute executable code based on the computer code in response to receiving the RDMA request. At block 1604, the method can send to the client a RDMA response that includes an execution result indicating an outcome of executing the executable code.

Aspects described above can be ultimately implemented in a network appliance that includes physical circuits that implement digital data processing, storage, and communications. The network appliance can include processing circuits, ROM, RAM, CAM, and at least one interface (interface(s)). In an embodiment, the CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). In an embodiment, the network appliance may be embodied as a single IC device (e.g., fabricated on a single substrate) or the network appliance may be embodied as a system that includes multiple IC devices connected by, for example, a printed circuit board (PCB). In an embodiment, the interfaces may include network interfaces (e.g., Ethernet interfaces and/or InfiniBand interfaces) and/or PCI Express (PCIe) interfaces. The interfaces may also include other management and control interfaces such as I2C, general purpose IOs, USB, UART, SPI, and eMMC.

As used herein the terms "packet" and "frame" may be used interchangeably to refer to a protocol data unit (PDU) that includes a header portion and a payload portion and that is communicated via a network protocol or protocols. In some embodiments, a PDU may be referred to as a "frame" in the context of Layer 2 (the data link layer) and as a "packet" in the context of Layer 3 (the network layer). For reference, according to the P4 specification: a network packet is a formatted unit of data carried by a packet-switched network; a packet header is formatted data at the beginning of a packet in which a given packet may contain a sequence of packet headers representing different network protocols; a packet payload is packet data that follows the packet headers; a packet-processing system is a data-processing system designed for processing network packets, which, in general, implement control plane and data plane algorithms; and a target is a packet-processing system capable of executing a P4 program.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A method comprising:
   registering a computer code with an InfiniB and channel adapter of a server to obtain a code key that is associated with the computer code;
   receiving, by a responder at the server and from a requester, a remote direct memory access (RDMA) request that includes the code key;
   executing an executable computer code based on the computer code in response to receiving the RDMA request; and
   sending to the requester a RDMA response that includes an execution result indicating an outcome of executing the executable computer code.

2. The method of claim 1 further comprising:
   submitting a remote procedure call (RPC) work request (WR) that includes the code key to a queue pair of the requester;
   transmitting the RDMA request based on the RPC WR; and
   receiving the RDMA response.

3. The method of claim 2, wherein
   the RPC WR indicates a memory region storing an input value for the executable computer code, and
   the RDMA request includes the input value.

4. The method of claim 2, wherein:
   the RPC WR includes a memory key associated with a memory region of the requester,
   the RDMA request includes the memory key, and
   the execution result is written into the memory region of the requester.

5. The method of claim 1 wherein the computer code is the executable computer code.

6. The method of claim 1 wherein the server compiles the computer code to produce the executable computer code.

7. The method of claim 1 wherein the requester sends the computer code to the server.

8. The method of claim 1 wherein the executable computer code is configured to:
   receive a second computer code as an input value; and
   register the second computer code with the InfiniB and channel adapter of the server to obtain a second code key that is associated with the second computer code, wherein the execution result includes the second code key.

9. A method comprising:
   sending, to a responder at a server and by a requester, a remote direct memory access request (RDMA) request that includes a code key associated with a computer code registered with an InfiniB and channel adapter of the server; and
   receiving from the responder a RDMA response that includes an execution result indicating an outcome of executing an executable computer code based on the computer code.

10. The method of claim 9 further wherein the RDMA request is based on a remote procedure call (RPC) work request (WR) that includes the code key and that is submitted to a queue pair of the requester.

11. The method of claim 10, wherein
the RPC WR indicates a memory region storing an input value for the executable computer code, and
the RDMA request includes the input value.

12. The method of claim 10, wherein:
the RPC WR includes a memory key associated with a memory region of the requester,
the RDMA request includes the memory key, and
the execution result is written into the memory region of the requester.

13. The method of claim 9 wherein the computer code is the executable computer code.

14. The method of claim 9 wherein the requester sends the computer code to the server.

15. The method of claim 9 wherein:
the code key is a memory key that indicates a memory region of the requester that includes the executable computer code;
the responder uses the memory key to obtain the executable computer code; and
the responder produces the execution result by executing the executable computer code.

16. An InfiniB and channel adapter comprising:
a memory that stores a computer code; and
a semiconductor chip operatively connected to the memory and configured to:
register the computer code and produce a code key that is associated with the computer code;
receive, from a requester, a remote direct memory access (RDMA) request that includes the code key; and
send to the requester a RDMA response that includes an execution result indicating an outcome of executing an executable computer code based on the computer code.

17. The InfiniB and channel adapter of claim 16, wherein:
the InfiniB and channel adapter sends, to a responder at a server having a second InfiniB and channel adapter, a second RDMA request that includes a second code key associated with a second computer code registered with the second InfiniB and channel adapter; and
the InfiniB and channel adapter receives from the responder a second RDMA response that includes a second execution result that results from executing a second executable computer code based on the second computer code.

18. The InfiniB and channel adapter of claim 17, wherein:
the InfiniB and channel adapter sends the second RDMA request based on a remote procedure call (RPC) work request (WR) that is received by a queue pair of the InfiniB and channel adapter and that includes the second code key.

19. The InfiniB and channel adapter of claim 18, wherein
the RPC WR indicates a memory region storing an input value for the executable computer code, and
the second RDMA request includes the input value.

20. The InfiniB and channel adapter of claim 18, wherein:
the RDMA request includes a memory key associated with a memory region of the requester, and
the execution result is written into the memory region of the requester.

21. The InfiniBand channel adapter of claim 18, wherein the computer code is the executable computer code.

* * * * *